United States Patent
Baek et al.

(10) Patent No.: US 12,163,568 B2
(45) Date of Patent: Dec. 10, 2024

(54) COVER CAP AND INSULATOR FOR SHOCK ABSORBER INCLUDING THE SAME

(71) Applicant: HL MANDO CORPORATION, Pyeongtaek-si (KR)

(72) Inventors: Kwangduk Baek, Yongin-si (KR); Mookwon Kim, Seoul (KR); Sewon Cho, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 17/585,768

(22) Filed: Jan. 27, 2022

(65) Prior Publication Data
US 2022/0235844 A1    Jul. 28, 2022

(30) Foreign Application Priority Data
Jan. 28, 2021    (KR) .................. 10-2021-0012325

(51) Int. Cl.
*F16F 9/32*    (2006.01)
*F16F 9/38*    (2006.01)

(52) U.S. Cl.
CPC .............. *F16F 9/3242* (2013.01); *F16F 9/38* (2013.01)

(58) Field of Classification Search
CPC .................................. F16F 9/3242; F16F 9/38
See application file for complete search history.

(56) References Cited

U.S. PATENT DOCUMENTS

| | | |
|---|---|---|
| 2005/0063630 A1 | 3/2005 | Handke |
| 2014/0049019 A1 | 2/2014 | Ahn et al. |
| 2015/0158363 A1 | 6/2015 | Patil et al. |

FOREIGN PATENT DOCUMENTS

| | | | |
|---|---|---|---|
| CN | 205479116 U | 8/2016 | |
| CN | 205523513 U | 8/2016 | |
| CN | 210911932 U | 7/2020 | |
| DE | 694 07 331 T2 | 4/1998 | |
| DE | 10332801 A1 * | 2/2005 | ........... B60G 13/003 |
| DE | 102012213275 A1 * | 1/2014 | ........... B60G 15/068 |
| DE | 102014208321 A1 * | 11/2015 | ........... B60G 13/003 |
| DE | 10 2015 007 743 A1 | 12/2016 | |
| EP | 816140 A1 * | 1/1998 | ........... B60G 15/067 |
| JP | 2013-15187 A | 1/2013 | |
| JP | 2018-132175 A | 8/2018 | |
| KR | 20170087760 A * | 7/2017 | |
| WO | WO-2014045533 A1 * | 3/2014 | ............. B60G 13/06 |
| WO | 2021/043916 A1 | 3/2021 | |

OTHER PUBLICATIONS

Office Action dated May 12, 2023, in connection with Chinese Patent Application No. 202210092797.7 (7 pages).
Office Action issued on Dec. 20, 2023, for corresponding German Patent Application No. 10 2022 200 851.0, along with English machine translation (12 pages).

* cited by examiner

*Primary Examiner* — Melody M Burch
(74) *Attorney, Agent, or Firm* — Hauptman Ham, LLP

(57) ABSTRACT

The present disclosure relates to a cover cap and an insulator for a shock absorber including the same, and the cover cap according to the embodiment of the present disclosure includes a cap main body having a circular plate shape, and a cap hollow portion penetrating a center of the cap main body. Further, a part or the entirety of the cap hollow portion is formed such that a diameter thereof increases toward one surface of the cap main body and the diameter maximally increases at one surface of the cap main body.

7 Claims, 5 Drawing Sheets

COVER CAP AND INSULATOR FOR SHOCK ABSORBER INCLUDING THE SAME

CROSS-REFERENCE TO RELATED APPLICATIONS

This application claims benefit and priority to Korean Patent Application No. 10-2021-0012325, filed on Jan. 28, 2021, with the Korean Intellectual Property Office, the disclosure of which is incorporated herein in its entirety by reference.

TECHNICAL FIELD

The present disclosure relates to a cover cap and an insulator for a shock absorber including the same, and more particularly, to an insulator used for a shock absorber capable of improving ride quality of a vehicle, and a cover cap included in the insulator.

BACKGROUND

In general, a shock absorber serves to inhibit or attenuate vibration transmitted from a road surface and absorbs vibrational energy in an upward/downward direction of a vehicle body in a state in which the shock absorber is mounted between a wheel and the vehicle body or the frame.

The shock absorber increases durability life by reducing dynamic stress of each component of the vehicle body, ensures grounding properties of tires by inhibiting unsprung mass motions, and improves motional performance of the vehicle by inhibiting a posture change caused by an inertial force.

The shock absorber typically includes a piston rod having one end fixed to the vehicle body, and a cylinder having one end fixed to the vehicle wheel. Further, an insulator is disposed at one end of the piston rod.

The insulator in the related art has a hollow portion formed at a center thereof so that one end of the piston rod may be penetratively coupled to the insulator. A body of the insulator is fastened to the vehicle body by bolting or the like. A bushing coupled to one end of the piston rod is movably installed in the insulator. Further, an impact absorbing member for absorbing impact is interposed between the bushing and the body of the insulator. In addition, a cover cap is coupled to the body in a direction opposite to a direction of the piston rod and covers the hollow portion.

However, the impact absorbing member disposed in the body of the insulator is deformed by the motion of the bushing. When a pushing force applied by the piston rod in a direction toward the vehicle body is high, the amount of deformation of the impact absorbing member increases, such that the impact absorbing member comes into contact with the cover cap. Further, as the pushing force applied by the piston rod in the direction toward the vehicle body becomes higher, a degree to which the impact absorbing member is pushed by the cover cap is increased, and the impact absorbing member loses vibration insulation properties.

When the vehicle travels in the state in which the impact absorbing member loses the vibration insulation properties as described above, the impact absorbing member cannot effectively inhibit vibration transmitted from the road surface, which causes noise.

SUMMARY

The present disclosure has been made in an effort to provide a cover cap and an insulator for a shock absorber including the same, which are capable of stably reducing transmitted vibration.

An exemplary embodiment of the present disclosure provides a cover cap including: a cap main body having a circular plate shape; and a cap hollow portion penetrating a center of the cap main body. Further, a part or the entirety of the cap hollow portion is formed such that a diameter thereof increases toward one surface of the cap main body and the diameter maximally increases at one surface of the cap main body.

One surface of the cap main body may be flat, and the other surface of the cap main body, which is opposite to one surface of the cap main body, may protrude toward a center of the circular plate shape.

A plurality of cap grooves may be formed in the other surface of the cap main body and radially disposed with respect to the cap hollow portion.

Another exemplary embodiment of the present disclosure provides an insulator for a shock absorber, the insulator including: a body having an installation hole penetratively formed in a longitudinal direction; a bushing installed in the installation hole of the body so as to be movable in the longitudinal direction and having a coupling hole formed such that one end of a piston rod extending from a cylinder is coupled to the coupling hole; an impact absorbing member configured to surround the bushing in the installation hole of the body; and a cover cap configured to cover the installation hole in a direction opposite to a direction in which one end of the piston rod is coupled. Further, the cover cap includes a cap main body having a circular plate shape, and a cap hollow portion penetrating a center of the cap main body, and a part or the entirety of the cap hollow portion is formed such that a diameter thereof increases toward one surface of the cap main body and the diameter maximally increases at one surface of the cap main body.

The impact absorbing member may be interposed between the bushing and the cover cap.

The impact absorbing member may be spaced apart from the cover cap even when the bushing moves in the longitudinal direction.

The impact absorbing member may be made of any one of rubber and urethane.

The body may further include a body hollow portion configured to communicate with the installation hole and formed such that one end of the piston rod is inserted into the body hollow portion.

The bushing may include a bushing protruding portion protruding in a cylindrical shape from one surface of the bushing facing the cover cap.

An outer diameter of the bushing protruding portion may be smaller than a minimum inner diameter of the cap hollow portion of the cover cap.

One surface of the cap main body may be flat, and the other surface of the cap main body, which is opposite to one surface of the cap main body, may protrude toward a center of the circular plate shape.

A plurality of cap grooves may be formed in the other surface of the cap main body and radially disposed with respect to the cap hollow portion.

According to the embodiment of the present disclosure, the cover cap and the insulator for a shock absorber including the same may stably reduce the transmitted vibration.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
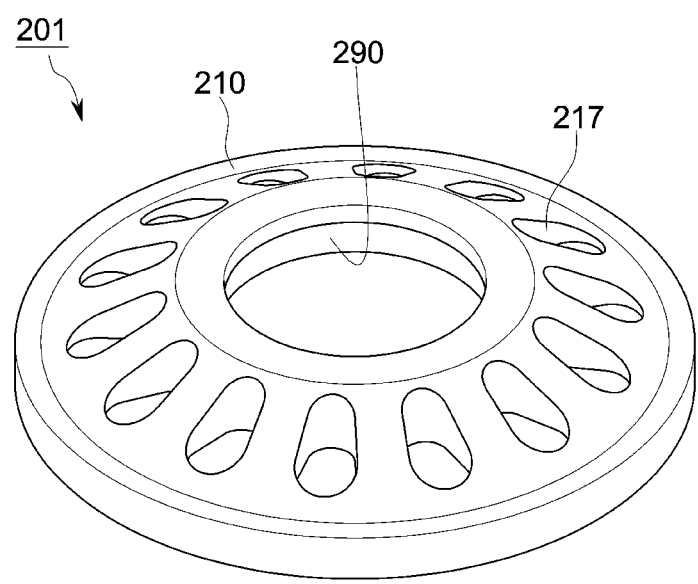
FIG. 1 is a front perspective view illustrating a cover cap according to an embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways, and is not limited to the embodiments described herein.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Embodiments of the present disclosure illustrate ideal embodiments of the present disclosure in detail. As a result, various modifications of the drawings are expected. Therefore, the embodiments are not limited to specific forms in regions illustrated in the drawings, and for example, include modifications of forms by the manufacture thereof.

Hereinafter, a cover cap 201 according to an embodiment of the present disclosure will be described with reference to FIGS. 1 and 2.

The cover cap 201 according to the embodiment of the present disclosure may be used for an insulator 101 for a shock absorber.

Figure 2:
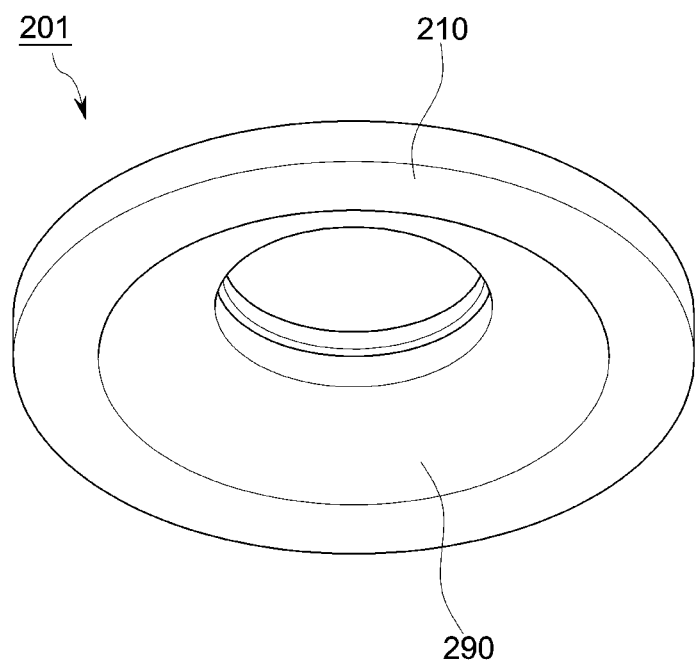
FIG. 2 is a rear perspective view illustrating the cover cap illustrated in FIG. 1.
Figure 3:
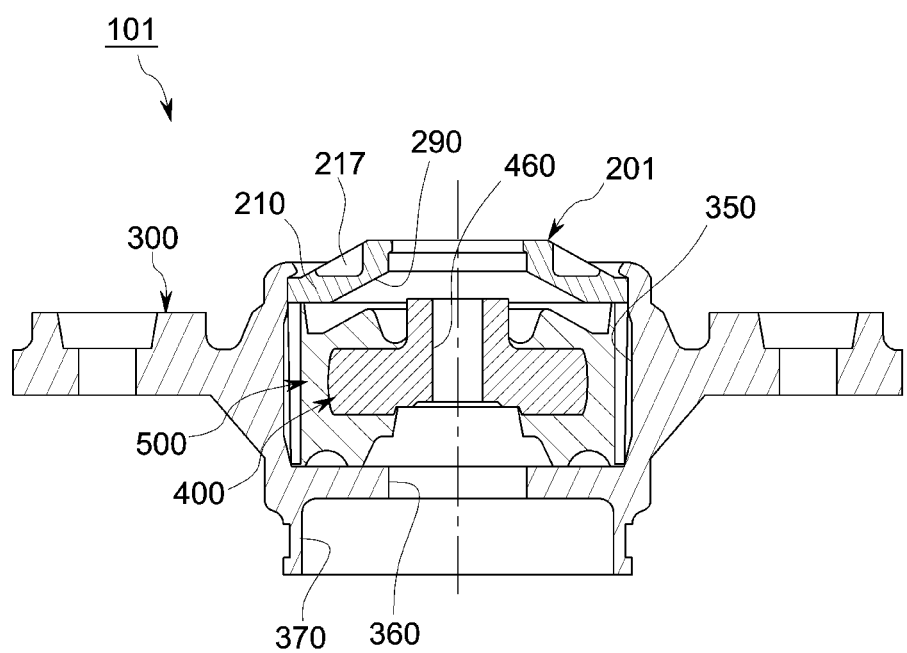
FIG. 3 is a cross-sectional view illustrating an insulator for a shock absorber including the cover cap illustrated in FIG. 1.

As illustrated in FIGS. 1 and 2, the cover cap 201 according to the embodiment of the present disclosure may include a cap main body 210 having a circular plate shape, and a cap hollow portion 290 penetrating a center of the cap main body 210. In this case, a part or the entirety of the cap hollow portion 290 may be shaped such that a diameter thereof increases toward one surface of the cap main body 210 and the diameter maximally increases at one surface of the cap main body 210. In this case, as illustrated in FIG. 3, one surface of the cap main body 210 faces a bushing 400 and an impact absorbing member 500 of the insulator 101 for a shock absorber to be described below.

One surface of the cap main body 210 is flat, and the other surface of the cap main body 210, which is opposite to one surface of the cap main body 210, may have a shape that protrudes toward a center of the circular plate shape. Further, a plurality of cap grooves 217 may be formed in the other surface of the cap main body 210 and radially disposed with respect to the cap hollow portion 290. The plurality of cap grooves 217, which is formed as described above, may improve strength of the cover cap 210 and reduce a weight of the cover cap 210.

With the above-mentioned configuration, the cover cap 201 according to the embodiment of the present disclosure may be formed to enable the insulator 101 for a shock absorber to stably reduce transmitted vibration.

Hereinafter, the insulator 101 for a shock absorber including the cover cap 201 according to the embodiment of the present disclosure will be described with reference to FIGS. 3 and 4.

The shock absorber serves to inhibit or attenuate vibration transmitted from a road surface and absorbs vibrational energy in an upward/downward direction of a vehicle body in a state in which the shock absorber is mounted between a wheel and the vehicle body or the frame. The shock absorber includes a piston rod (not illustrated) fixed to a vehicle body, and a cylinder (not illustrated) fixed to a vehicle wheel. Further, the insulator 101 is installed at one end of the piston rod.

As illustrated in FIG. 3, the insulator 101 for a shock absorber may include a body 300, the bushing 400, the impact absorbing member 500, and the cover cap 201 described above.

The body 300 may include an installation hole 350 penetratively formed in a longitudinal direction, and a body hollow portion 360 communicating with the installation hole 350 and formed such that one end of the piston rod (not illustrated) is inserted into the body hollow portion 360. In the present specification, the longitudinal direction may be identical to the longitudinal direction of the piston rod.

The bushing 400 may be inserted into the installation hole 350 of the body 300 to be described below. That is, the installation hole 350 may have a cylindrical shape so that the bushing 400 may be inserted into the installation hole 350.

The body 300 may further include a rubber coupling groove 370 formed to communicate with the body hollow portion 360. A bumper rubber (not illustrated) coupled to one end of the piston rod (not illustrated) may be inserted into the rubber coupling groove 370. A lower end of the bumper rubber is in close contact with an upper end of the cylinder (not illustrated), such that the bumper rubber may elastically support a portion between the body 300 and the cylinder. Further, the piston rod may be penetratively coupled in the upward/downward direction in the bumper rubber.

A rim portion of the body 300 may extend to have a predetermined length and define a predetermined area. Further, a fastening member such as a bolt may be installed on the rim portion of the upper end of the body 300 and coupled to the vehicle body.

The bushing 400 is installed in the installation hole 350 of the body 300 so as to be movable in the longitudinal direction. To this end, intervals, in which the bushing 400 may move, may be defined above and below the installation hole 350 of the body 300.

The bushing 400 may include a coupling hole 460 formed to be coupled to one end of the piston rod extending from the cylinder.

A stepped portion formed at an outer periphery of the piston rod is caught by a lower end of the bushing 400, and an end of the piston rod may be inserted into the coupling hole 460 of the bushing.

The bushing 400 may include a bushing protruding portion protruding in a cylindrical shape from one surface of the bushing 400 facing the cover cap 201. In this case, an outer diameter of the bushing protruding portion may be smaller than a minimum inner diameter of the cap hollow portion 290 of the cover cap 201.

The impact absorbing member 500 may be formed to surround the bushing 400 in the installation hole 350 of the body 300. In particular, the impact absorbing member 500 is also interposed between the bushing 400 and the cover cap 201. Specifically, the impact absorbing member 500 may surround all edges of the lateral surface and the upper and lower surfaces of the bushing 400. Further, the impact absorbing member 500 may be spaced apart from the cover cap 201 even though the bushing 400 moves in the longitudinal direction in the installation hole 350 of the body 300.

The impact absorbing member 500 may be made of any one of rubber and urethane. The impact absorbing member 500 may effectively absorb impact by using non-linear properties even when high-frequency waves with low amplitude occurs.

The cover cap 201 may cover the installation hole 350 of the body 300 in a direction opposite to the direction in which one end of the piston rod is coupled. That is, the cover cap 201 may be coupled to an opened upper side of the installation hole 120 of the body 300.

The cover cap 201 may include the cap main body 210 having a circular plate shape, and the cap hollow portion 290 penetrating the center of the cap main body 210. Further, a part or the entirety of cap hollow portion 290 may be formed such that a diameter thereof increases toward one surface of the cap main body 210 and the diameter maximally increases at one surface of the cap main body 210. In this case, one surface of the cap main body 210 is a surface facing the bushing 400 and the impact absorbing member 500.

Figure 4:
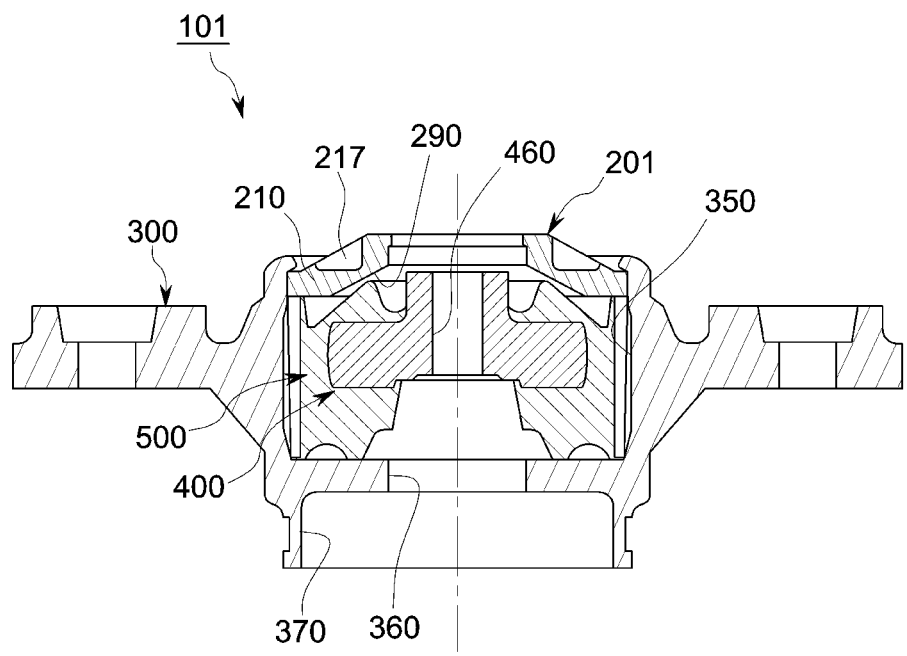
FIG. 4 is a cross-sectional view illustrating an operating state of the insulator for a shock absorber illustrated in FIG. 3.

Since the cover cap 201 has the above-mentioned shape, the pushing force applied by the piston rod in the direction toward the vehicle body is strongly applied, such that the bushing 400 moves, as illustrated in FIG. 4. Therefore, the impact absorbing member 500 may be kept spaced apart from the cover cap 201 without coming into contact with the cover cap 201 even though the impact absorbing member 500 disposed in the installation hole 350 of the body 300 is deformed.

Therefore, since the impact absorbing member 500 is pushed by the cover cap 201, it is possible to prevent the impact absorbing member 500 from losing vibration insulation properties. That is, it is possible to prevent the occurrence of noise by effectively inhibiting vibration transmitted from the road surface.

With the above-mentioned configuration, the cover cap 201 and the insulator 101 for a shock absorber including the same according to the embodiment of the present disclosure may stably reduce transmitted vibration.

Hereinafter, the comparison between vibration properties of the embodiment and the comparative example will be described with reference to FIG. 5.

The embodiment is the cover cap 201 and the insulator 101 for a shock absorber including the same according to the embodiment of the present disclosure, and the comparative example is an insulator in the related art. Specifically, in the case of the comparative example, when the bushing moves as the pushing force applied by the piston rod in the direction toward the vehicle body is strongly applied, the impact absorbing member comes into contact with the cover cap while being deformed.

Figure 5:
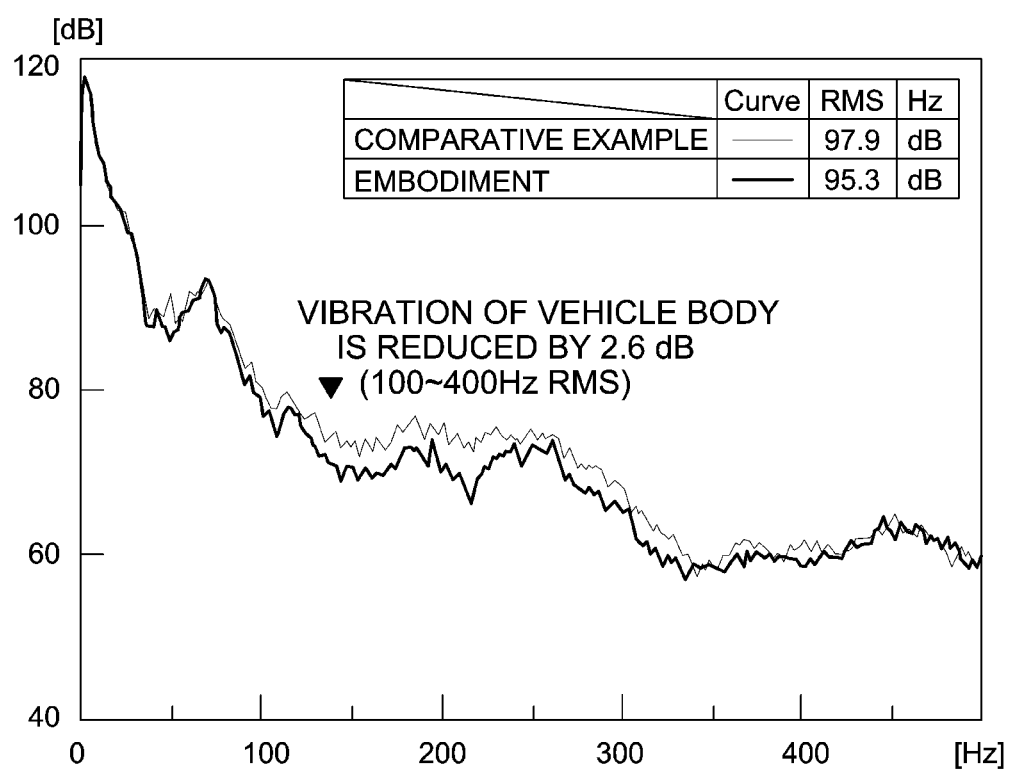
FIG. 5 is a graph illustrating a vibration reducing effect implemented by the insulator for a shock absorber including the cover cap according to the embodiment of the present disclosure.

As illustrated in FIG. 5, it can be ascertained that vibration is reduced on average by 2.6 dB in a section of 100 to 400 Hz in the embodiment compared to the comparative example.

While the embodiments of the present disclosure have been described with reference to the accompanying drawings, those skilled in the art will understand that the present disclosure may be carried out in any other specific form without changing the technical spirit or an essential feature thereof.

Accordingly, it should be understood that the aforementioned embodiments are described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An insulator for a shock absorber, the insulator comprising:
    a body having an installation hole penetratively formed in a longitudinal direction;
    a bushing installed in the installation hole of the body so as to be movable in the longitudinal direction and having a coupling hole formed such that one end of a piston rod connected to a cylinder is coupled to the coupling hole;
    an impact absorbing member configured to surround the bushing in the installation hole of the body; and
    a cover cap configured to cover the installation hole in a direction opposite to a direction in which one end of the piston rod is coupled,
    wherein the cover cap comprises a cap main body forming with a circular plate shape and having an upper surface and a lower surface, and a cap hollow portion penetrating a center of the cap main body,
    wherein the lower surface of the cap main body is flat, and an upper surface of the cap main body, which is opposite to the lower surface of the cap main body, protrudes toward a center of the circular plate shape,
    wherein a lower portion of the cap hollow portion is formed such that a diameter thereof increases toward an inner edge of the lower surface of the cap main body and the diameter maximally increases at the inner edge of the lower surface of the cap main body, and wherein the impact absorbing member is formed of a single piece including
a first surface directly in contact with the lower surface of the cap main body and
a second surface connected to the first surface and distanced away from the lower surface of the cover cap by an empty space in the longitudinal direction, and
wherein even when the bushing moves in the longitudinal direction toward the cover cap, the second surface of the single piece of the impact absorbing member is kept distanced away from the lower surface of the cover cap by the empty space.

2. The insulator of claim 1, wherein a portion of the impact absorbing member is interposed between the bushing and the cover cap.

3. The insulator of claim 1, wherein the impact absorbing member is made of any one of rubber and urethane.

4. The insulator of claim 1, wherein the body having the installation hole comprises a body hollow portion configured to communicate with the installation hole and formed such that one end of the piston rod is inserted into the body hollow portion.

5. The insulator of claim 1, wherein the bushing comprises a bushing protruding portion protruding in a cylindrical shape from one surface of the bushing facing the cover cap.

6. An insulator for a shock absorber, the insulator comprising:
a body having an installation hole penetratively formed in a longitudinal direction;
a bushing installed in the installation hole of the body so as to be movable in the longitudinal direction and having a coupling hole formed such that one end of a piston rod extending from a cylinder is coupled to the coupling hole;
an impact absorbing member configured to surround the bushing in the installation hole of the body; and
a cover cap configured to cover the installation hole in a direction opposite to a direction in which one end of the piston rod is coupled,
wherein the cover cap comprises a cap main body forming with a circular plate shape and having an upper surface and a lower surface, and a cap hollow portion penetrating a center of the cap main body,
wherein the lower surface of the cap main body is flat, and an upper surface of the cap main body, which is opposite to the lower surface of the cap main body, protrudes toward a center of the circular plate shape,
wherein a lower portion of the cap hollow portion is formed such that a diameter thereof increases toward an inner edge of the lower surface of the cap main body and the diameter maximally increases at the inner edge of the lower surface of the cap main body,
wherein the bushing comprises a bushing protruding portion protruding in a cylindrical shape from one surface of the bushing facing the cover cap, and
wherein an outer diameter of the bushing protruding portion is smaller than a minimum inner diameter of the cap hollow portion of the cover cap.

7. The insulator of claim 1, wherein a plurality of cap grooves is formed in the upper surface of the cap main body and radially disposed with respect to the cap hollow portion.

* * * * *